3,506,492
SOLID ELECTROLYTE BATTERY HAVING
LITHIUM OR LITHIUM ALLOY ANODE
Edward S. Buzzelli, Solon, and Robert A. Rightmire,
Northfield, Ohio, assignors to The Standard Oil Company, Cleveland, Ohio, a corporation of Ohio
Filed May 8, 1968, Ser. No. 727,552
Int. Cl. H01m 43/06, 43/00, 11/00
U.S. Cl. 136—6                                      8 Claims

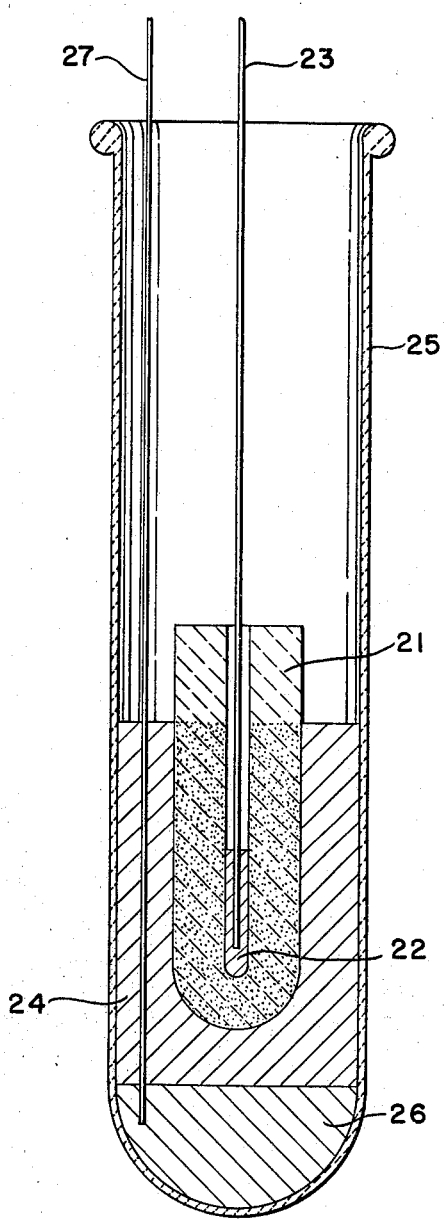

ABSTRACT OF THE DISCLOSURE

A secondary electrical energy storage battery consisting of a lithium or a lithium alloy anode, an insulating metal oxide cathode, and a lithium sulfate electrolyte. This battery is operable above the temperature at which lithium sulfate undergoes a transition from a non-conductor to a conductor, and up to its melting point of 860° C. This battery can also be operated above the melting temperature of the electrolyte, but the advantages of the solid state electrolyte will not inhere. The preferred embodiment of the battery exploits the solid state feature of the lithium sulfate electrolyte. The temperature of operation can be lowered by doping lithium sulfate with alkali halide salts. Capacity of this battery is in excess of 100 watt-hours per pound.

SOLID ELECTROLYTE BATTERY

This invention relates to a secondary or a rechargeable electrical energy storage system which is characterized by a solid state electrolyte. More specifically, the electrical energy storage system comprises lithium sulfate electrolyte, a lithium or a lithium alloy anode, and an insulating metal oxide cathode which takes up lithium ions at a voltage which is more positive with respect to lithium. Examples of such oxides are tantalum oxides, bismuth oxides, antimony oxides, tungsten oxides, molybdenum oxides, iron oxides, vanadium oxides, etc.

With the advent of the motor vehicle pollution age, a great deal of effort has been dedicated to development of non-polluting systems for propelling vehicles. One of such systems is the subject of this disclosure, although not limited nor restricted in application to vehicle propulsion.

Generally speaking, energy can be stored electrostatically, as in a capacitor unit, or chemically, as in an electrical energy storage device or battery. Both of such means of energy storage, however, are unsuitable for continuous commercial use involving a constant electrical energy drain in that the former, while permitting a quick charge and discharge, suffers from an insufficient electrical storage capacity; while the latter, although much superior with respect to the electrical storage capacity because of its high power delivery and slow discharge, suffers by virtue of its protracted charging rate. An ideal electrical energy storage device, therefore, combines the quick charge characteristic of the capacitor with the slow discharge and high electrical energy storage capacity of the battery.

The device of the present invention combines the enviable characteristics of a relatively quick charge, in the range of about half an hour to two hours; a relatively high electrical storage capacity, on the order of 100 watt-hours per pound; and a solid state elctrolyte.

The solid state electrolyte must satisfy three main criteria. First, the material must conduct electricity primarily by ions rather than by electrons. Conduction by electrons lowers the voltage of a galvanic cell below that predicted from thermodynamic calculations. Secondly, the solid electrolyte must be fairly inert to the materials in a cell, especially if any of such materials should happen to be in a liquid state at the operating temperature. A reactive layer would interfere with the operation of the electrochemical cell and excessive corrosion would severely limit the life of the cell and thereby decrease its utility substantially. Thirdly, the solid electrolyte must not be porous since penetration by a liquid electrode would short out the circuit.

A solid state electrolyte battery has a number of important advantages. Since the electrolyte remains solid at the operating temperature, no leakage or sealing problems are encountered. Although seemingly superficial, the sealing problem can be a major obstacle. Sealing of batteries utilizing corrosive molten alkali salt electrolytes has been a major problem, which as yet has not been completely solved. With a solid electrolyte, the interelectrode distance can be reduced to a minimum, thus reducing the internal resistance and size of the battery. Since the solid electrolyte is interposed between opposing electrodes, the necessity for an electrode spacer is obviated, thus disposing of another problem which can be a source of considerable intrigue, as those skilled in the art recognize. Being in the solid state, the electrolyte is relatively non-corrosive, thus insuring lasting structural integrity of the related components.

The solid state electrolyte in the herein described electrical energy storage system is lithium sulfate. The particular function of lithium sulfate is made possible by its unique property of ionizing below its melting point and becoming electrically conducting. This transition occurs at about 575° C. and is accompanied by a crystal change from monoclinic to cubic. The result of the crystal phase change is the precipitation of lithium ions which facilitate ionic conductivity. Since lithium ions in the crystal structure of lithium sulfate are electrical conductors, the electrical resistance of the monoclinic lithium sulfate declines as the crystal phase change shifts to the cubic form. The electrical resistance of lithium sulfate declines logarithmically with increase in temperature and at about 575° C., there is a four to five order of magnitude drop over a small temperature range of about 50° C.

Prior to its use as an electrolyte, lithium sulfate must be dried to remove moisture. A technique which is effective in dehydrating lithium sulfate involves melting the hydrated lithium sulfate in an evaporating dish and cooling it to room temperature. This simple operation produces a dry solid lithium sulfate that does not readily pick up water from the air. For example, a sample of lithium sulfate, dehydrated in the manner described above, was found to contain 2 percent of water after having been exposed to air for two weeks.

Ovshinsky U.S. Patents 3,201,736 and 3,271,584 disclose a scheme of depositing lithium sulfate upon a matrix of a higher melting material for the purpose of maintaining the electrolyte as a whole in the solid state. In this respect, lithium sulfate should present a continuous phase in order to promote conduction. As the solid electrolyte, consisting of lithium sulfate deposited on a matrix of a higher melting material, is heated above the melting point of lithium sulfate, the molten lithium sulfate forms small pools or rivulets within the matrix so that the electrolyte structure as a whole remains a solid mass with pools or rivulets of molten lithium sulfate contained therein for conducting the current flow. The matrix material, as disclosed by the Ovshinsky patents, is an inert material of a higher melting point than lithium sulfate. Examples of such matrix materials are lithium ceramic frit, other lithium compounds, electrical insulators, etc. These materials should not react with lithium sulfate to adversely affect the required conductivity nor to produce reaction products having undesirable properties.

The electrolyte of the herein described invention may also comprise a mixture of lithium sulfate and an alkali halide salt or salts such as lithium, potassium, cesium, sodium, and rubidium chlorides and bromides. The composition of the mixed salt electrolyte may vary from 10 to 95 mole percent lithium sulfate. In this composition range, the mixed salt electrolyte conducts in what appears to be a solid phase at temperatures as low as about 400° C.

Although the advantages of the solid state electrolyte will not inhere, the herein described device can be operated at temperatures exceeding the melting point of the electrolyte.

The anode comprises lithium or a lithium alloy such as aluminum-lithium, indium-lithium, tin-lithium, lead-lithium, silver-lithium, copper-lithium, etc. Ternary lithium alloys can also be used. The preferred anode is the highly reversible aluminum-lithium electrode. The lithium or lithium alloy anode can function in solid or liquid form, depending on the temperature at which the system is operated. When the temperature is above the melting point of the anode, the solid state electrolyte can be utilized to contain the liquid anode. Handling of the lithium alloy anode must be conducted under an inert atmosphere to prevent oxidation of lithium and the consequent formation of $Li_2O$, a white powder.

The aluminum-lithium anode can be manufactured by combining lithium with aluminum and thus producing a preformed alloy of aluminum and lithium, or, alternatively, electrochemically, by charging a substantially pure aluminum bar in an electrolyte containing lithium ions to the extent of about one amp-hour per gram of aluminum, whereby lithium is diffused into the aluminum bar.

The solid aluminum-lithium alloy anode comprises aluminum and incidental impurities in amounts of from about 70 to 95 weight percent based on total composition, and from about 5 to 30 weight percent lithium. The lithium concentration is critical since at 5 percent of lithium and below, the capacity of the anode is inadequate for practical applications, while above about 30 percent lithium, the discharge is not flat but gradient downward. Incidental impurities such as for example copper, magnesium, manganese, indium, and iron may be present in amount of less than 10 weight percent. An anode consisting entirely of lithium can also be utilized, however, because of its low melting point, i.e., 186° C., it will be liquid at the operating temperature and its discharge will be gradient downward.

The aluminum-lithium electrode is capable of storing lithium metal from the electrolyte without forming an extensive liquid. Hence, at an operating temperature below its melting point, the electrode remains solid and is capable of diffusing the lithium metal from electrolyte through its structure. It has been found that on charging the cell comprising the aluminum-lithium electrode, the electrode expands, whereby the lithium metal from electrolyte enters the electrode structure. On discharge, the lithium metal leaves the electrode structure, resulting in its contraction. As is evident, the electrode structure must be able to withstand the stresses of expansion and contraction and for this reason, the aluminum-lithium electrode is preconditioned prior to use.

The preconditioning takes the form of slow charge and slow discharge of the electrode. This slow preconditioning results in an electrode of substantially uniform aluminum-lithium distribution which facilitates take-up and release of the lithium metal upon subsequent fast charge and fast discharge of the electrode. If the initial charge and discharge preconditioning cycles are carried out too rapidly, local regions of liquid are built up resulting in pitting of the electrode. This pitting of the electrode is deleterious in that it promotes cracking and general deterioration of the electrode. Evidence of pitting is visible in the form of lithium agglomeration. Aluminum-lithium electrode cycled by slow charge and discharge shows a fine uniform distribution of the lithium metal in the aluminum. The aluminum-lithium anode-alkali halide molten salt system is more fully described in U.S. patent application Ser. No. 518,473 filed Jan. 3, 1966, now U.S. Patent No. 3,445,288.

The aluminum-lithium electrode is characterized as a constant potential electrode. This means that when aluminum-lithium electrode is charged to a potential which must of necessity be below the decomposition potential of the particular electrolyte in the system, the discharge should be at a constant voltage until the very end when the system becomes fully depleted. In actual practice, however, it has been found that the aluminum-lithium electrode does not discharge at a constant potential. The potential drop of the electrode is a gradient downwardly. This problem has been solved by removing the surface film from the electrode in an inert atmosphere and maintaining the electrode in an inert atmosphere or submerged in an inert hydrocarbon until it is ready for use. Removal of surface film as described, will result in an aluminum-lithium electrode which is truly a constant potential electrode. The procedure for removing the surface film from an aluminum-lithium electrode is more fully described in U.S. patent application Ser. No. 550,239 filed on May 16, 1966.

During advancement studies of the aluminum-lithium electrode, it was observed that dendrites gradually developed on the electrode during charge-discharge cycling. Dendritic growth proceeded outwardly from the face of the aluminum-lithium electrode and towards the opposing cathode. When dendritic growth was allowed to continue to grow, the growth formed a bridge between electrodes resulting in the short-circuiting of the electrical storage system. This problem has now been solved by circumscribing the aluminum-lithium electrode with a mechanical screen. This screen is from about 100 mesh to 20 mesh, and provides between 15 and 35 percent open area. U.S. patent application Ser. No. 518,113 filed Jan. 3, 1966, now U.S. Patent No. 3,428,493, constitutes a complete disclosure relating to the provision of a screen on the aluminum-lithium electrode.

Opposed to the lithium or lithium alloy anode is a normally insulating metal oxide cathode. Examples of such oxides are tantalum oxides, bismuth oxides, antimony oxides, tungsten oxides, molybdenum oxides, iron oxides, vanadium oxides, etc. The oxides include stoichiometric and non-stoichiometric compounds. Initially, the oxides are in the solid state at the operating temperature of the electrical storage device. However, during operation, the oxides may undergo a phase change which is predictable from a phase diagram.

The oxides are obtainable in powder form. The cathode is made by mixing about 80 parts by weight of an oxide with about 20 parts by weight of a binder and compressing the mixture at 4000–10,000 p.s.i. while maintaining the temperature in the range of 90–120° C. The formed cathode is then placed in a furnace and heated under an inert atmosphere to bake out the binder. Durite® phenolic binders were used, although, any binder which can be reduced to carbon should be effective. The cathode may consist of a single oxide or a mixture of such oxides. In the manufacture of an oxide cathode, the use of the binder can be avoided. In such an instance, the cathode can be made by sintering the oxide powder.

On charging of the electrical energy storage device, lithium metal enters the anode until the potential becomes negligible, or the charging process is terminated. On discharge, lithium metal in the anode relinquishes electrons to the anode and enters the electrolyte in the form of ions. At the opposite side, lithium ions enter the insulating metal oxide cathode and transform it into an electrical conductor and a functional component of the electrical energy storage device. The lithium ions within the cathode structure react with the oxide substance to form a reversible compound.

The maximum voltage for the unit cell described above is limited to the decomposition potential of the electrolyte, i.e., about 3.2 volts for lithium sulfate. To assemble an electrical energy storage device capable of delivering higher voltages, it would only be necessary to stack several unit cells in series, as is well known in the art.

A heating means is provided for the purpose of converting the electrolyte from a non-conducting to a conducting state. Once the storage device is started and is in normal operation, no external heat is necessary to maintain it in operating condition. Insulation is of course provided for the purpose of conserving heat. With a particular insulation, the electrolyte can be maintained in a molten condition for over sixty hours thus dispensing with the necessity of reheating the electrolyte to bring it up to the operating condition.

A conventional manner of assembling an electrical storage cell is to position anode and cathode in spaced, face-to-face relationship, and to dispose electrolyte between and in contact with the electrodes. There is a gamut of variations of the conventional cell. The electrolyte can be deposited as a thin film on the surface of one of the electrodes or it can be disposed on a matrix, as was already described. The electrodes can be used in the form of sheets, screens, plates, liquid pools, etc., or they can be deposited on a matrix or as a thin film on opposing faces of the electrolyte, assuming that the physical state of the electrode material is compatible with this function at the operating temperature. This disclosure is not intended to cover all possible variations nor is it intended to limit the instant invention to the specific embodiments disclosed.

EXAMPLE I

A porous fired clay crucible 21 measuring 1½ inches in length, 5/16 inch in diameter and having an axial 1/16 inch bore, was filled with 0.25 gram of ferric oxide ($Fe_3O_4$) 22. A 16-gauge stainless steel current collector wire 23 was inserted into the ferric oxide. The crucible was disposed over solid $LiSO_4$ 24 contained in a 200 mm. x 38 mm. Vycor® test tube 25. The test tube was heated to about 900° C., above the melting point of $Li_2SO_4$. The crucible was allowed to soak in and absorb the liquid $Li_2SO_4$ for an hour. As the temperature was lowered and while $LiSO_4$ was still liquid, chunks of Al-Li alloy, 16 weight percent lithium, were placed in $LiSO_4$ in the space between the test tube and the crucible. An argon atmosphere was maintained in the test tube to prevent reaction between oxygen and lithium. Just as $Li_2SO_4$ was solidifying, the chunks of Al-Li alloy melted into the slush to form liquid pool 26. A 16-gauge stainless steel current collector wire 27 was then inserted into the Al-Li alloy. The entire assembly was solidified by taking it momentarily out of the furnace.

The temperature of the cell was stabilized at 650° C. at which time it was preconditioned by putting it on charge-discharge cycling of a constant voltage charge at 3.1 volts and discharge at constant current of 5 ma. The cycling was continued overnight and in the morning, it was charged for one hour and then discharged at 10 ma. for three hours from 2.5 volts down to 1.0 volt. The graph showed plateaus at 2.3-2.4 volts and at 1.5-1.6 volts. The capacity of this cell was about 9 amp-hours per inch³ of the cathode.

EXAMPLE II

A cell was constructed in the same manner as in Example I. Al-Li alloy served as the anode, 0.06 gram of vanadium pentoxide ($V_2O_5$) as the cathode, and $Li_2SO_4$ as the electrolyte. The cell was cooled to 620° C. and then put on an automatic 10-minute charge at 3 volts and discharged at constant current of 10 ma. After seven cycles, a graph was obtained which showed a gradient type of discharge for initial 24 minutes followed by a flat discharge continuing thereafter for 48 minutes, at which time the discharge was terminated. The capacity was calculated to be 8.3 watt-minutes per gram of cathode.

EXAMPLE III

A disk, 1 inch in thickness, was made from a block of fired porous ceramic brick. The disk had dimensions to fit a 200 mm. x 38 mm. Pyrex® test tube. A pair of cavities were drilled in the disk for the purpose of providing a storage space for electrode materials.

An evaporating dish, containing $Li_2SO_4$, was heated to about 900° C. to melt $Li_2SO_4$. The disk was impregnated with $Li_2SO_4$ by immersing it in the $Li_2SO_4$ melt. 0.4 gram of antimony trioxide ($Sb_2O_3$) was placed in one cavity and Al-Li chips in the other. 16-gauge stainless steel current collector wires were inserted into each electrode. The disk assembly was placed into a 200 mm. x 38 mm. Pyrex® test tube and argon gas was pumped in to provide an inert atmosphere. The cell was heated to 600° C. and was discharged at a constant current of 20 ma. for 6 hours. Its capacity was 28 watt-minutes per gram of cathode.

EXAMPLE IV $Li_2SO_4$ was melted in a 200 mm. x 38 mm. Vycor® test tube. A porous fired clay crucible, containing 0.3 gram of tungsten oxide ($WO_2$) cathode, was impregnated with $Li_2SO_4$ by partially immersing it in the $Li_2SO_4$ melt. As the temperature was lowered to about 600° C., chunks of Al-Li alloy anode were dropped into the $Li_2SO_4$ melt. The alloy melted and formed a pool at the bottom of the test tube. An end portion of a stainless steel lead wire was immersed in the Li-Al pool. When the temperature of the cell stabilized at about 600° C., the cell was preconditioned by charge-discharge cycling. Although capacity of this cell was low, <0.1 amp-hour per inch³, it exhibited a long life, characterized by 65 cycles of 50 ma. charge and 10 ma. discharge.

EXAMPLE V

Example IV was repeated using dry electrolyte consisting of $Li_2SO_4$ and 30 weight percent LiBr. The capacity was 0.1 watt-minute per gram of cathode.

EXAMPLE VI

The tantalum oxide cathode was manufactured by pressing 28.3 grams of tantalum oxide ($Ta_2O_5$) plus 5.7 grams of carbon at about 6000 p.s.i. in a ¾-inch diameter mold. The resulting disk was ¾ inch in diameter and 0.09 inch in thickness. This disk was split in half along the diameter, and one part of it was cemented to the end of a graphite rod ¼ inch in diameter.

A cell was assembled by immersing a ⅛-inch diameter aluminum rod and the cathode into a pre-electrolyzed electrolyte mixture of lithium sulfate and 51.2 mole percent lithium bromide. After about 20 charge-discharge cycles at the operating temperature of 495° C., the capacity at 1 ma. constant current discharge was 0.1 amp-hour per inch³ of the cathode.

EXAMPLE VII

Tantalum oxide ($Ta_2O_5$) powder was compressed at about 6000 p.s.i. in a ¾-inch mold to make a disk 0.09 inch in thickness. This disk was sintered in air at about 800° C. for 24 hours. One end of a ¼ inch in diameter graphite rod was chamfered and one half of the sintered disk, weighing 0.65 gram, was cemented with a conducting carbon cement to the chamfered portion.

Dry lithium sulfate was melted at 900° C. in a 200 mm. x 38 mm. Vycor® test tube. On cooling, and prior to solidification, 1.0 gram of bismuth and 2.3 grams of lead were dropped into the melted lithium sulfate. The metals melted and formed a small pool at the bottom of the test tube. A stainless steel rod, functioning as a current collector, was thrust into the metal pool. The graphite rod, carrying one half of the tantalum oxide disk, was lowered gradually into the melt to the point where the tantalum oxide was completely immersed in molten lithium sulfate.

The entire assembly was cooled to 620° C., at which temperature lithium sulfate solidified, and then placed on automatic charging cycle overnight. The cycle consisted of one-half hour charge to 2.5 volts, followed by discharge at 10 ma. to about 1 volt.

It should be understood that upon charging, the bismuth and lead metals were charged with lithium and formed a Bi-Pb-Li alloy anode. At the operating temperature of 620° C., this alloy was in the liquid state.

The next morning, the cell was charged for one hour to 2.5 volts and then discharged at a constant current of 2 ma. The capacity of the cell was 0.005 watt-hour per gram of cathode or 0.5 amp-hour per inch$^3$.

We claim:
1. A rechargeable electrical energy storage battery operable below the melting point of lithium sulfate comprising an anode consisting of lithium and lithium alloys, a cathode consisting of a metal oxide in opposed spaced relationship to said anode, and a solid electrolyte consisting essentially of lithium sulfate disposed between and in contact with said anode and said cathode.

2. Battery of claim 1 wherein said anode is selected from the group consisting of antimony-lithium, tin-lithium, and indium-lithium alloys.

3. Battery of claim 1 wherein said anode is aluminum-lithium alloy.

4. Battery of claim 1 wherein said cathode consists of an insulating metal oxide or mixtures thereof.

5. Battery of claim 4 wherein said oxide is selected from the group consisting of tantalum oxides, bismuth oxides, antimony oxides, tungsten oxides, molybdenum oxides, vanadium oxides, and ferric oxide.

6. Battery of claim 3 wherein the composition of said aluminum-lithium alloy is about 70 to 95 weight percent aluminum, the remainder being lithium.

7. Battery of claim 1 wherein said lithium sulfate electrolyte is disposed on a matrix.

8. A rechargeable electrical energy storage battery operable under an inert atmosphere and below the melting point of lithium sulfate comprising an aluminum-lithium alloy anode consisting of 5 to 30 weight percent lithium and the remainder being aluminum, an insulating metal oxide cathode in opposed spaced relationship to said anode, and an electrolyte consisting essentially of lithium sulfate disposed between and in contact with said anode and said cathode, said electrolyte being in the solid state at the operating temperature of said battery.

References Cited

UNITED STATES PATENTS

| | | | |
|---|---|---|---|
| 2,937,219 | 5/1960 | Minnick et al. | 136—6 |
| 3,043,896 | 7/1962 | Herbert et al. | 136—6 |
| 3,160,531 | 12/1964 | Spindler | 136—120 |
| 3,236,694 | 2/1966 | Stenger et al. | 136—100 |
| 3,410,730 | 11/1968 | Rightmire et al. | 136—100 |
| 3,410,731 | 11/1968 | Rightmire et al. | 136—100 |
| 3,445,288 | 5/1969 | Buzzelli | 136—6 |

ALLEN B. CURTIS, Primary Examiner

A. SKAPARS, Assistant Examiner

U.S. Cl. X.R.

136—83, 153